US008570212B2

(12) United States Patent
Yano

(10) Patent No.: US 8,570,212 B2
(45) Date of Patent: Oct. 29, 2013

(54) WAVEGUIDE CONVERTER, ANTENNA AND RADAR DEVICE

(75) Inventor: Koji Yano, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 153 days.

(21) Appl. No.: 13/082,134

(22) Filed: Apr. 7, 2011

(65) Prior Publication Data

US 2012/0056778 A1 Mar. 8, 2012

(30) Foreign Application Priority Data

Apr. 9, 2010 (JP) ................................ 2010-090965

(51) Int. Cl.
*G01S 13/00* (2006.01)

(52) U.S. Cl.
USPC ............ 342/175; 342/124; 342/350; 343/786

(58) Field of Classification Search
USPC ........... 342/153, 175; 343/743, 762, 790, 850
See application file for complete search history.

(56) References Cited

U.S. PATENT DOCUMENTS 3,037,204 A * 5/1962 Allen et al. .................. 342/350
3,274,604 A * 9/1966 Lewis .......................... 343/786
4,740,795 A * 4/1988 Seavey .......................... 343/786
5,066,959 A * 11/1991 Huder ........................... 343/786
7,315,222 B2 * 1/2008 Freeman ......................... 333/26
7,606,592 B2 * 10/2009 Becker .......................... 455/523
2003/0016162 A1 * 1/2003 Sasada et al. .................. 342/70
2004/0135720 A1 * 7/2004 Sasada et al. ................ 342/175
2006/0097912 A1 * 5/2006 Isono et al. .................. 342/175
2007/0013581 A1 * 1/2007 Iijima et al. ................. 342/175
2007/0109178 A1 * 5/2007 Schultheiss ................... 342/124
2011/0248883 A1 * 10/2011 Miyagawa et al. ........... 342/175
2011/0248884 A1 * 10/2011 Yano et al. .................... 342/175

FOREIGN PATENT DOCUMENTS

JP 2009-509416 A 3/2009
WO WO 2007/035523 A2 3/2007

* cited by examiner

*Primary Examiner* — John B Sotomayor
*Assistant Examiner* — Marcus Windrich
(74) *Attorney, Agent, or Firm* — Birch, Stewart, Kolasch & Birch, LLP

(57) ABSTRACT

This disclosure provides a waveguide converter, which includes a first waveguide for propagating an electromagnetic wave, a second waveguide for being inputted the electromagnetic wave from the first waveguide and propagating the electromagnetic wave in a direction different from the propagating direction of the electromagnetic wave in the first waveguide, and an elongated-plate-shaped inner conductor arranged between the first waveguide and the second waveguide so that end portions of the inner conductor are exposed to the inside of the first waveguide and the second waveguide, respectively.

20 Claims, 7 Drawing Sheets

WAVEGUIDE CONVERTER, ANTENNA AND RADAR DEVICE

CROSS-REFERENCE TO RELATED APPLICATION(S)

The application claims priority under 35 U.S.C. §119 to Japanese Patent Application No. 2010-090965, which was filed on Apr. 9, 2010, the entire disclosure of which is hereby incorporated by reference.

TECHNICAL FIELD

The present invention relates to a waveguide converter, and an antenna and a radar device which are provided with the waveguide converter.

BACKGROUND OF THE INVENTION

For example, radar devices generate electromagnetic waves in a microwave source such as a magnetron, guide the electromagnetic waves to an antenna via one or more waveguides, and then emit the electromagnetic waves to the outside from the antenna. In a case where the electromagnetic waves are propagated (transmitted) from a rectangular cross section upstream waveguide to a rectangular cross section downstream waveguide where cross-sectional orientations and extending directions of the upstream and downstream waveguides differ therebetween, an electromagnetic wave coupling (converting) structure is to be adopted, in order to install the waveguides in a narrow space. For example, the following configuration is known. If the electromagnetic waves are propagated from a vertically arranged waveguide to a transversely arranged waveguide, a loop probe having a given diameter is arranged within the vertical waveguide, at a suitable location on a tube wall of the waveguide. Further, an electric field probe set to another given diameter is arranged in the transverse waveguide side. Thus, an impedance matching is obtained between both the waveguides to enable a coupling of the electromagnetic waves.

WO2007/035523 discloses that a radar device for emitting electromagnetic waves to the outside through a waveguide adopts the above-mentioned coupling technique. In FIGS. 6 and 7 of WO2007/035523, a configuration in which a signal coupler is provided between waveguide sections is illustrated. The signal coupler includes a coaxial connector, and also includes a conductive-wire loop probe made of a highly conductive material which extracts or feeds electromagnetic waves from/to the waveguide. The coaxial connector includes a central conductive wire and a cylindrical insulated spacer both having a predetermined length, and an impedance matching of the transmission path is obtained by suitably designing sizes and the like of these components.

However, it is difficult to design a diameter of the transverse cross-section of the probe mentioned above in order to obtain the impedance matching. Moreover, because of the size of the diameter of the loop probe portion, the loop shape could not be easily achieved and, thus, it requires processing such as partially cutting the loop portion. Therefore, the manufacture is not easy while the structure is complicated. In addition, the signal coupler disclosed in WO2007/035523 is not structurally simple, either.

SUMMARY OF THE INVENTION

Thus, the present invention is made in view of the above situations, and provides a waveguide converter that has a simple structure for guiding a microwave from one waveguide to another, and can be manufactured easily, as well as an antenna and a radar device which are provided with the waveguide converter.

According to one aspect of the invention, a waveguide converter is provided, which includes a first waveguide for propagating an electromagnetic wave, a second waveguide for being inputted the electromagnetic wave from the first waveguide and propagating the electromagnetic wave in a direction different from the propagating direction of the electromagnetic wave in the first waveguide, and an elongated-plate-shaped inner conductor arranged between the first waveguide and the second waveguide so that end portions of the inner conductor are exposed to the inside of the first waveguide and the second waveguide, respectively.

Thereby, even when using the first waveguide and the second waveguide while at least one of extending directions and cross-sectional orientations of the waveguides differ therebetween, the electromagnetic waves can suitably be coupled from the first waveguide to the second waveguide. In addition, according to this configuration, since the plate-shaped material is adopted as the inner conductor, the structure of the inner conductor is simple and, thus, manufacturing thereof can be simpler, by punching (and/or pressing), for example.

The waveguide converter may further includes an insulator for electrically insulating the inner conductor from inside walls of the first waveguide and the second waveguide.

The inner conductor may have a first section that is exposed to the inside of the first waveguide. A first width of the first section is wider than a second width of a second section that is exposed to the inside of the second waveguide.

The insulator may include a cylindrical portion that fits onto at least a part of the second section.

The first waveguide and the second waveguide may have central axes that are partially parallel to each other.

The first waveguide may have a rectangular cross section, and a width of a first side face of the first waveguide that faces the second waveguide and a width of another first side face of the first waveguide that opposes the first side face may be narrower than widths of second side faces that are perpendicular to the first side faces.

The inner conductor may have a convex portion in a part of the first section.

The convex portion may have a third width in a tip end portion of the first section, the third width being narrower than the first width.

The second section and the convex portion may have substantially the same width.

The inner conductor may have a to-be-supported section that extends from at least one of the first section and the convex portion by a predetermined length in a direction perpendicular to the elongating axis of the inner conductor.

The first waveguide may have a supporting portion for supporting the to-be-supported section, the supporting portion being provided to a side face of the first waveguide.

According to another aspect of the invention, an antenna is provided, which includes a first waveguide for propagating an electromagnetic wave, a second waveguide for being inputted the electromagnetic wave from the first waveguide and propagating the electromagnetic wave in a direction different from the propagating direction of the electromagnetic wave in the first waveguide, an elongated-plate-shaped inner conductor arranged between the first waveguide and the second waveguide so that end portions of the inner conductor are exposed to the inside of the first waveguide and the second waveguide, respectively, and an antenna for emitting the electromagnetic wave propagated in the second waveguide, from an emitting surface to air.

Thereby, even when using the first waveguide and the second waveguide while at least one of extending directions and cross-sectional orientations of the waveguides differ therebetween, the electromagnetic waves can suitably be coupled from the first waveguide to the second waveguide. In addition, according to this configuration, since the plate-shaped material is adopted as the inner conductor, the structure of the inner conductor is simple and, thus, manufacturing thereof can be simpler, by punching (and/or pressing), for example.

The antenna may further include an insulator for electrically insulating the inner conductor from inside walls of the first waveguide and the second waveguide.

The inner conductor may have a first section that is exposed to the inside of the first waveguide. A first width of the first section is wider than a second width of a second section that is exposed to the inside of the second waveguide.

The first waveguide and the second waveguide may be arranged on the opposite side from the emitting surface of the antenna. The antenna may further include a radome for accommodating at least a part of the first waveguide, the second waveguide, and the antenna.

According to another aspect of the invention, a radar device is provided, which includes an electromagnetic wave generating source for generating an electromagnetic wave, a first waveguide for being inputted the electromagnetic wave from one end thereof and propagating the electromagnetic wave, a second waveguide for being inputted the electromagnetic wave from the first waveguide and propagating the electromagnetic wave in a direction different from the propagating direction of the electromagnetic wave in the first waveguide, an antenna for emitting the electromagnetic wave propagated in the second waveguide, from an emitting surface to air, and an elongated-plate-shaped inner conductor arranged between the first waveguide and the second waveguide so that end portions of the inner conductor are exposed to the inside of the first waveguide and the second waveguide, respectively.

Thereby, even when using the first waveguide and the second waveguide while at least one of extending directions and cross-sectional orientations of the waveguides differ therebetween, the electromagnetic waves can suitably be coupled from the first waveguide to the second waveguide. In addition, according to this configuration, since the plate-shaped material is adopted as the inner conductor, the structure of the inner conductor is simple and, thus, manufacturing thereof can be simpler, by punching (and/or pressing), for example.

The first waveguide and the second waveguide may be arranged on the opposite side from the emitting surface of the antenna.

The radar device may further include a radome for accommodating at least a part of the first waveguide, the second waveguide, and the antenna.

The radar device may further include an insulator for electrically insulating the inner conductor from inside walls of the first waveguide and the second waveguide.

The inner conductor may include a first section that has a first width at one end side along the elongated axis and is exposed to the inside of the first waveguide, and a second section that has a second width at the other end sire along the elongated axis and is exposed to the inside of the first waveguide, the second width being narrower than the first width.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
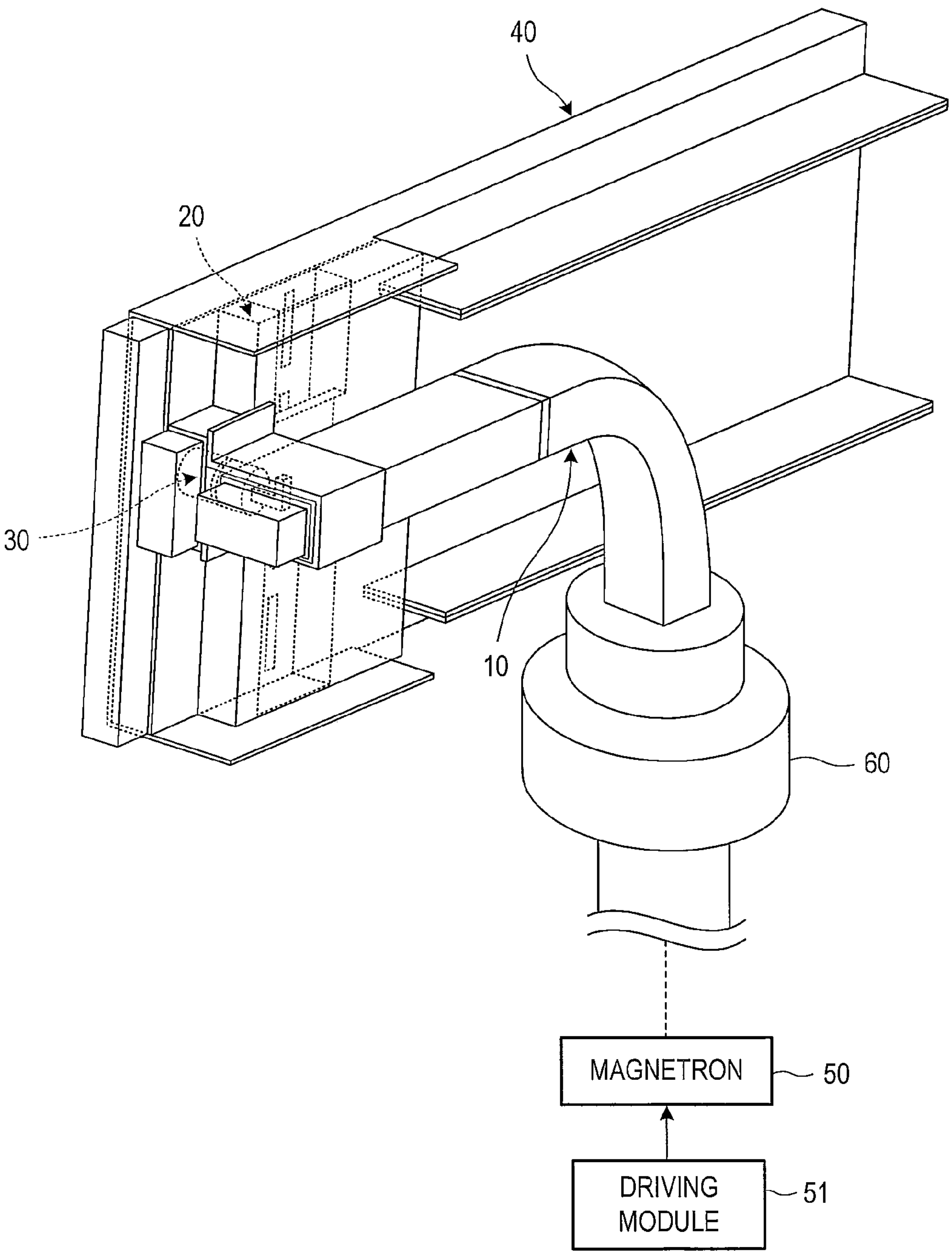
FIG. 1 is a perspective view schematically showing one embodiment of a two-dimensional array slot antenna to which a waveguide converter according to the present invention is applied.
Figure 2:
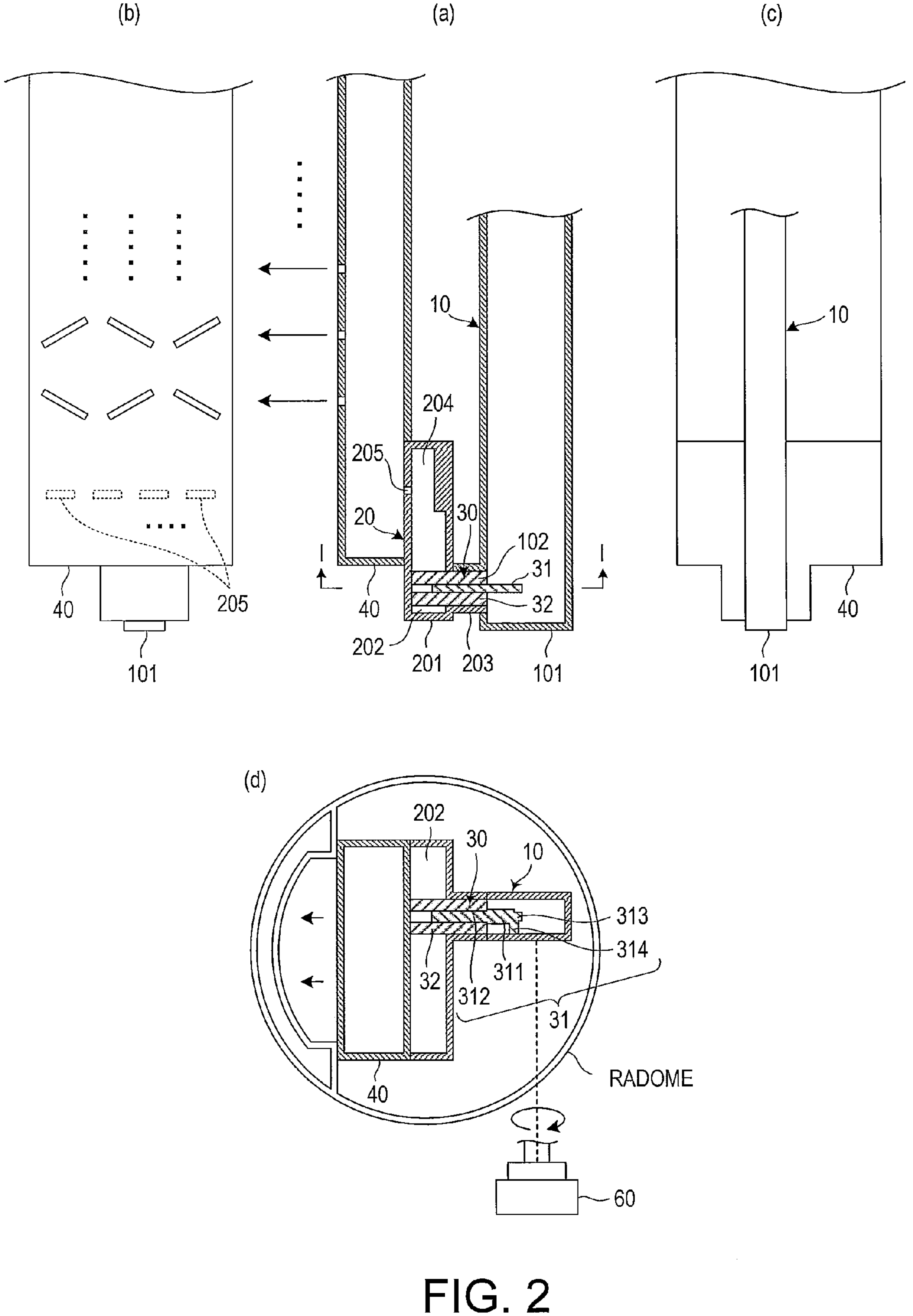
FIG. 2 shows a structure of the waveguide converter and its peripherals, where the part (a) of FIG. 2 is a plan view, the parts (b) and (c) show side views, and the part (d) shows a cross section taken along a line I-I of the part (a), where a radome covers the waveguides.

FIG. 1 is a perspective view schematically showing one embodiment of a two-dimensional array slot antenna to which a waveguide converter according to the present invention is applied. FIG. 2 shows a structure of the waveguide converter and it peripherals, where the part (a) is a plan view, and the parts (b) and (c) are side views. The part (d) of FIG. 2 is a cross-sectional view taken along a line I-I of the part (a), where a radome is attached to the waveguides. In FIG. 1, a typical orientation of the slot array is illustrated, where the emission surface of the antenna is oriented vertically so that the microwaves are emitted horizontally.

The two-dimensional array slot antenna includes an introduction waveguide section 10 as a first waveguide for introducing microwaves from below. The introduction waveguide section 10 extends vertically and it upper end section bends horizontally. The two-dimensional array slot antenna also includes an electromagnetic-wave-transmitting waveguide section 20 as a second waveguide which is a waveguide section downstream of the introduction waveguide section 10 and extends horizontally in the opposite direction of the horizontal section of the introduction waveguide section 10 (i.e., the propagating directions of the electromagnetic waves are opposite between the waveguide sections). The two-dimensional array slot antenna also includes a waveguide converter 30 for coupling the introduction waveguide section 10 and the electromagnetic-wave-transmitting waveguide section 20, and an antenna section 40.

The introduction waveguide section 10 is introduced microwaves from a microwave source (for example, a magnetron 50) directly or via another waveguide, and propagates the introduced microwave to the downstream side via the waveguide converter 30. The introduction waveguide section 10 has a predetermined rectangular cross section, and is designed to have a size so that it can generate the standing waves of, for example, 9.4 GHz microwave, which is a subject herein. A circular opening 102 to which the waveguide converter 30 is provided is formed in one side face of the introduction waveguide section 10, at a predetermined position (typically, near one end), where an impedance matching is obtained from one end portion 101.

The electromagnetic-wave-transmitting waveguide section 20 guides electromagnetic waves transmitted through the waveguide converter 30 from the introduction waveguide section 10, to the antenna section 40. An input space 202 into which the electromagnetic waves from the introduction waveguide section 10 are inputted is formed within a potion of the electromagnetic-wave-transmitting waveguide section 20 on the side of one end 201 thereof. The input space 202 communicates with a cylindrical connection part 203 for communicating with the opening 102 of the introduction waveguide section 10, and the waveguide converter 30 is arranged within the connection part 203. Moreover, the other end side of the input space 202 within the electromagnetic-wave-transmitting waveguide section 20 communicates with an electromagnetic-wave-transmitting space 204. As shown in FIGS. 1 and 2, the electromagnetic-wave-transmitting space 204 has a required dimension in a direction perpendicular to the longitudinal axis of the horizontal section of the introduction waveguide section 10.

On the left surface side in the part (a) of FIG. 2 of the electromagnetic-wave-transmitting space 204, a predetermined number of slots 205 (here, four) are arranged in series at a predetermined pitch, extending vertically (i.e., the spreading direction of the electromagnetic-wave-transmitting space 204). The electromagnetic-wave-transmitting space 204 divides the electromagnetic waves inputted into the input space 202, and propagates the branched electromagnetic waves to the antenna section 40 through the four slots 205. The input space 202 is located at a position corresponding to one of the four slots 205 which is located inside among the four so that the impedance matching is obtained.

The waveguide converter 30 penetrates the opening 102 and the opened connection part 203. The waveguide converter 30 includes an inner conductor 31 and an insulation material 32 made of, for example, Teflon®, which surrounds the inner conductor 31.

Figure 3:
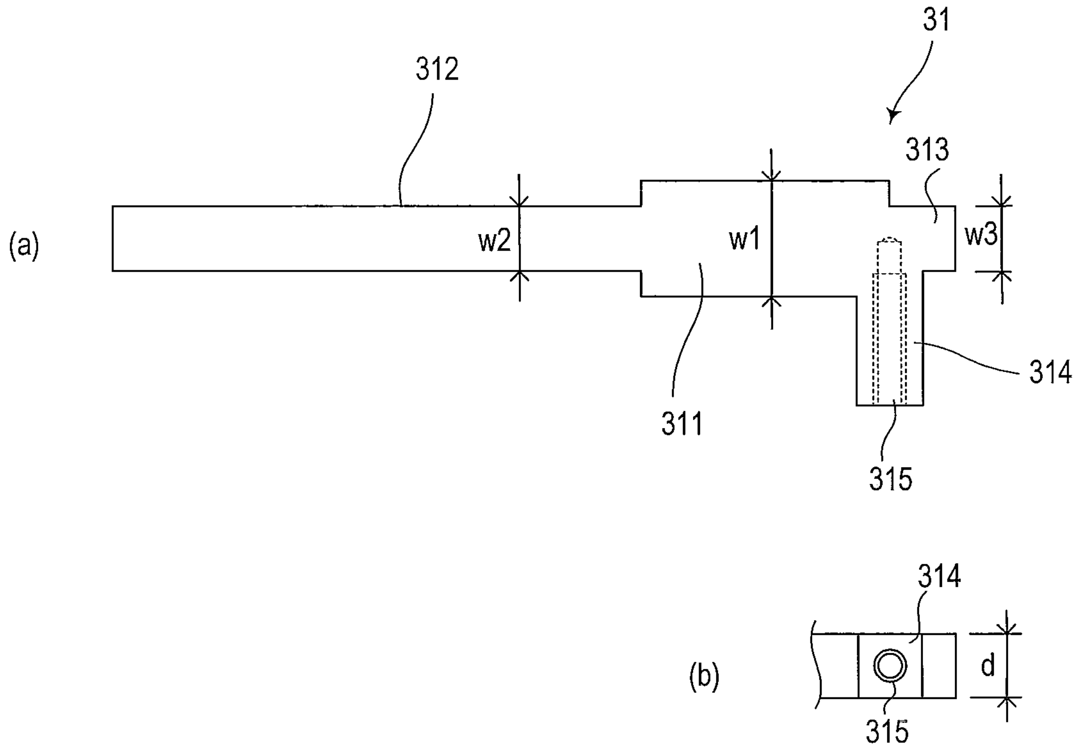
FIG. 3 show a detailed structure of an inner conductor, where the part (a) of FIG. 3 is an enlarged view of the inner conductor shown in the part (d) of FIG. 2 and the part (b) of FIG. 3 is a partial bottom view of the part (a) of FIG. 3.

FIG. 3 shows a detailed structure of the inner conductor 31, where the part (a) of FIG. 3 is an enlarged view of the inner conductor shown in the part (d) of FIG. 2 and the part (b) of FIG. 3 is a partial bottom view of the part (a) of FIG. 3. In FIG. 3, the inner conductor 31 has a predetermined thickness d along the horizontal axis and, in this embodiment, it is formed of a plate member having a thickness of 2 mm. The inner conductor 31 is made of an electrically-conducting material and, preferably, a high electrically-conducting material (for example, bronze) is adopted. In place of bronze, a material having properties of an electrically-conducting material or a high electrically-conducting material may be employed.

The inner conductor 31 has roughly an elongated-shape. The inner conductor 31 includes a first section 311, a second section 312, and a third section 313 along the elongated axis thereof. The first section 311 is located approximately at one end side of the inner conductor 31 (right side in FIG. 3), has a first width w1 in the vertical direction (for example, 3 mm), and is exposed to the inside of the introduction waveguide section 10. The second section 312 is located at the other end side of the inner conductor 31 (left side in FIG. 3), has a second width w2 (for example, 2 mm) which is narrower than the first width of the first section 311, and is exposed to the electromagnetic-wave-transmitting waveguide section 20. The third section 313 mainly functions as an impedance matching section, which is formed so as to project the right end of the first section 311. Moreover, the inner conductor 31 includes a to-be-supported section 314 which extends from at least one of the first section and 311 and the third section 313 by a predetermined length in a direction perpendicular to the longitudinal axis of the inner conductor 31.

The width w1 the first section 311 and the longitudinal dimension of the second section 312 are designed to have a necessary dimension, respectively, and, here, they are set to 7.55 mm and 16.1 mm, respectively. Moreover, the width w1 of the first section 311 and the width w2 of the second section 312 are designed to obtain the impedance matching with the introduction waveguide section 10 and the electromagnetic-wave-transmitting waveguide section 20, respectively, which are both exposed. Therefore, electromagnetic waves are appropriately coupled therebetween. In this embodiment, the third section 313 is provided on the right end side of the first section 311 so as to have a predetermined width w3 (for example, 2 mm) which is narrower than the width w1 of the first section 311 (i.e., 3 mm).

The second section 312 is fitted into the insulation material 32. The insulation material 32 has a cylindrical outer shape and, on the other hand, the inner shape thereof has a rectangular cross-section so as to fit the second section 312 therein, while having the cross-sectional dimensions corresponding to the cross-sectional dimension of the second section 312 (i.e., 2-mm thickness×2-mm width, in this embodiment). Note that the insulation material 32 has a length so as to reach the top of the electromagnetic-wave-transmitting waveguide section 20 when the insulation material 32 is fitted in the electromagnetic-wave-transmitting waveguide section 20, as shown in FIG. 2.

In this embodiment, the length and the width of the third section 313 is shorter and narrower than the width of the first section 311 as shown in FIG. 3 (here, it has 2 mm in length and 2 mm in width). The third section 313 is provided at a suitable location of the first section 311 to obtain impedance matching with the introduction waveguide section 10. The third section 313 may be provided laterally at a suitable longitudinal or vertical intermediate location of the first section 311, and may have a predetermined length and width taking impedance matching similar to the above in consideration. The shape may not be limited as well to the rectangular shape, and may be a semi-circular shape, for example. Moreover, the number of the third section 313 is not limited to one but may be two or more taking such impedance matching in consideration, while they are provided at respective suitable locations of the first section 311.

The to-be-supported section 314 has a predetermined dimension (for example, 2 mm in width and 4 mm in length). A hole 315 for fastening is formed in the to-be-supported section 314 in order to attach the waveguide converter 30 to the introduction waveguide section 10 by a screw (not illustrated), at a suitable location of an inner wall of the introduction waveguide section 10 ("supporting portion" in the claims). FIG. 2 shows such a fixed state. Thus, if the inner conductor 31 is formed from a plate material like this embodiment, the inner conductor 31 can be formed in a required shape and the hole 315 can be formed simply by punching.

Returning to FIG. 2, the antenna section 40 is formed of a waveguide and, two or more slots are arrayed vertically and horizontally (see the part (b) of FIG. 2). The antenna section 40 is formed with a slot array where two ore more slots are two-dimensionally arranged in the surface of the antenna section (left side surface in the part (a) of FIG. 2), for example, by simple punching, to form an emission surface. In this embodiment, each slot row arranged vertically includes three slots are formed alternately in inclination angle so that adjacent slots incline in the opposite directions to each other. The slot array is arranged in the electromagnetic wave propagation direction at a predetermined pitch, for example, ½ wavelength of the tube (or odd times of ½ wavelength). Thereby, the electromagnetic waves in the TEn0 mode are propagated within the waveguides, and are emitted from the slot array while having a required directivity.

Figure 4:
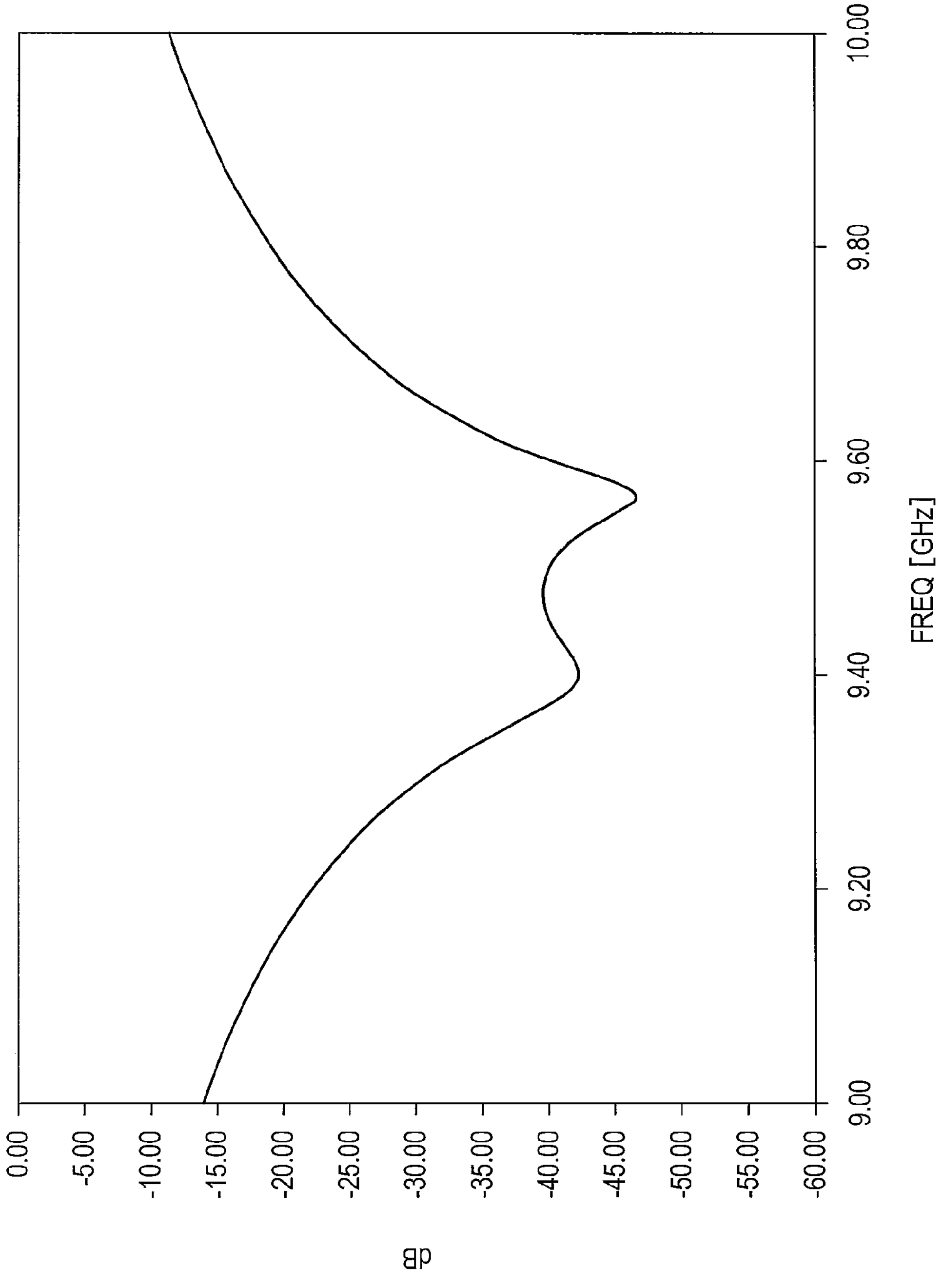
FIG. 4 is a graph showing a simulation result of return loss when using the inner conductor shown in FIG. 3.

FIG. 4 shows a graph showing a simulation result of return loss when using the inner conductor 31 of FIG. 3. As shown in FIG. 4, when the center frequency of the microwaves to be used is 9.41 GHz and the bandwidth ranges from 9.38 GHz to 9.44 GHz, it can be seen that the return loss level is less than −30 dB and, thereby the coupling is appropriate.

Figure 5:
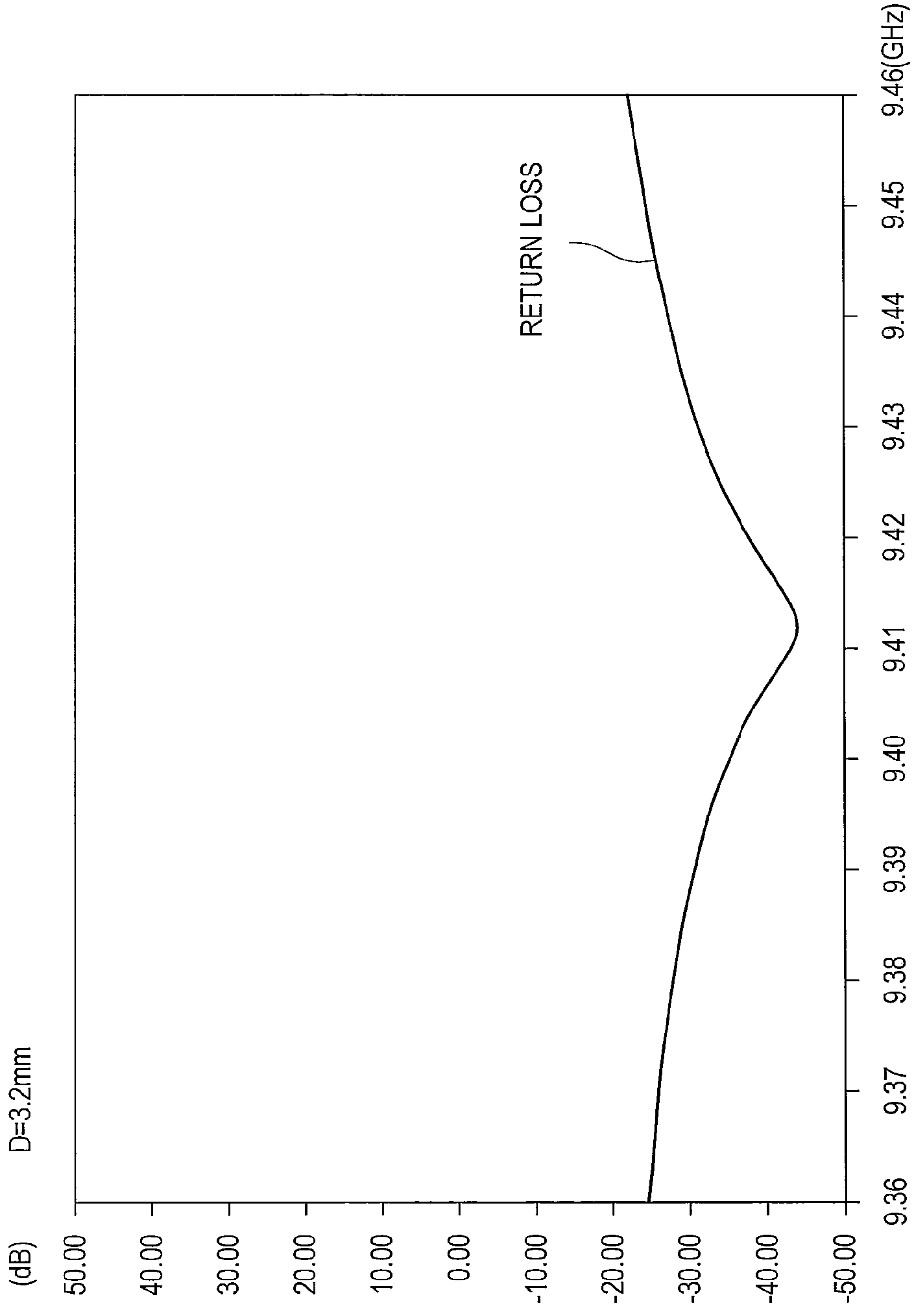
FIG. 5 is a graph showing a simulation result of the return loss in a case where a third section is 3.2 mm, when using the inner conductor shown in FIG. 3.
Figure 6:
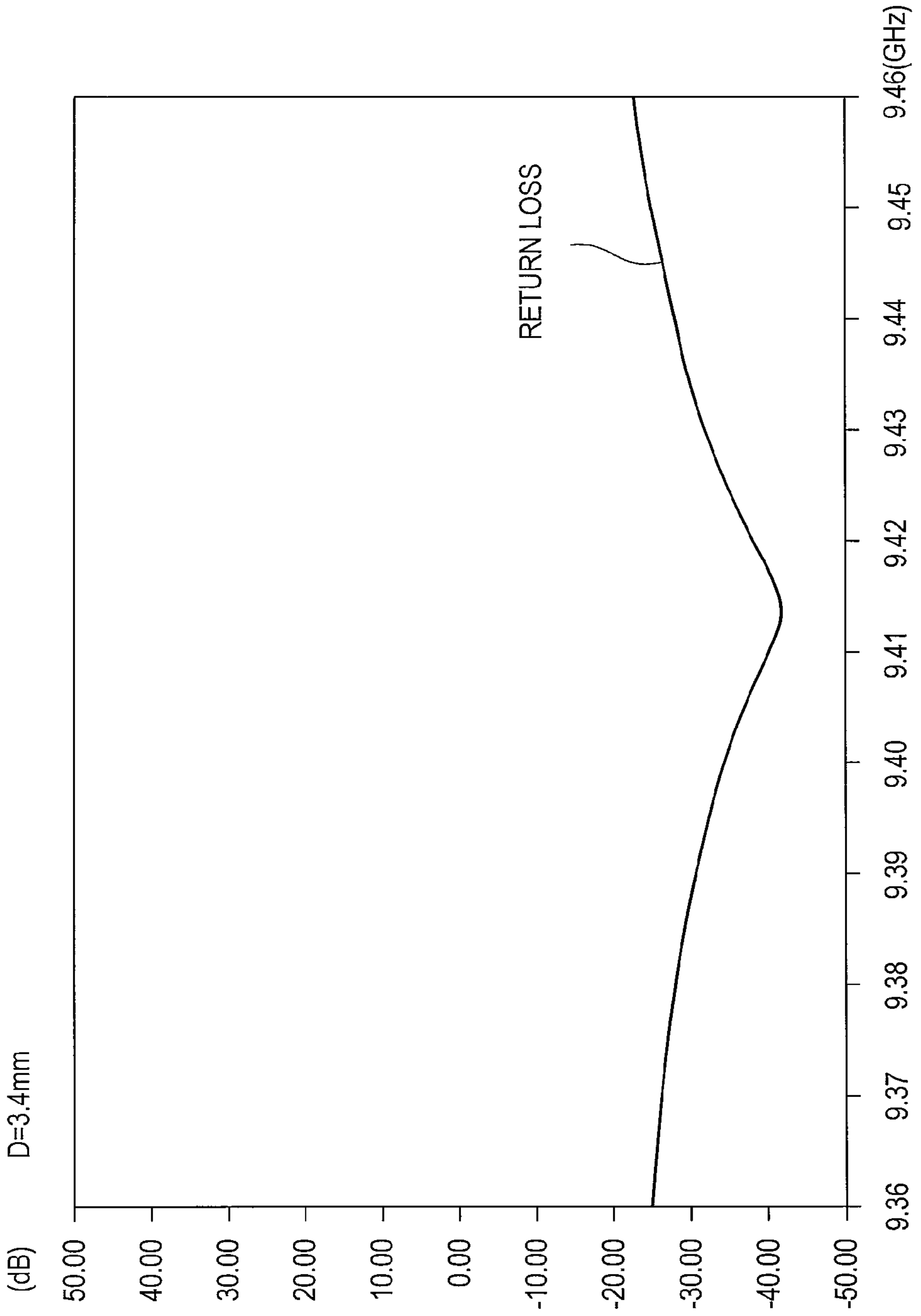
FIG. 6 is a graph showing a simulation result of the return loss in a case where the third section is 3.4 mm, when using the inner conductor shown in FIG. 3.

FIGS. 5 and 6 show graphs of return loss simulations for 3.2-mm width and 3.4-mm width of the first section 311 with respect to 3.0 mm. In both FIGS. 5 and 6, the minimum values of the return loss level appeared near the center 9.41 GHz in the range from 9.38 GHz to 9.44 GHz. Moreover, the return loss level slightly exceeded −30 dB near 9.38 GHz and 9.44 GHz in the respective simulations, and were substantially less than approximately −30 dB in the band.

Figure 7:
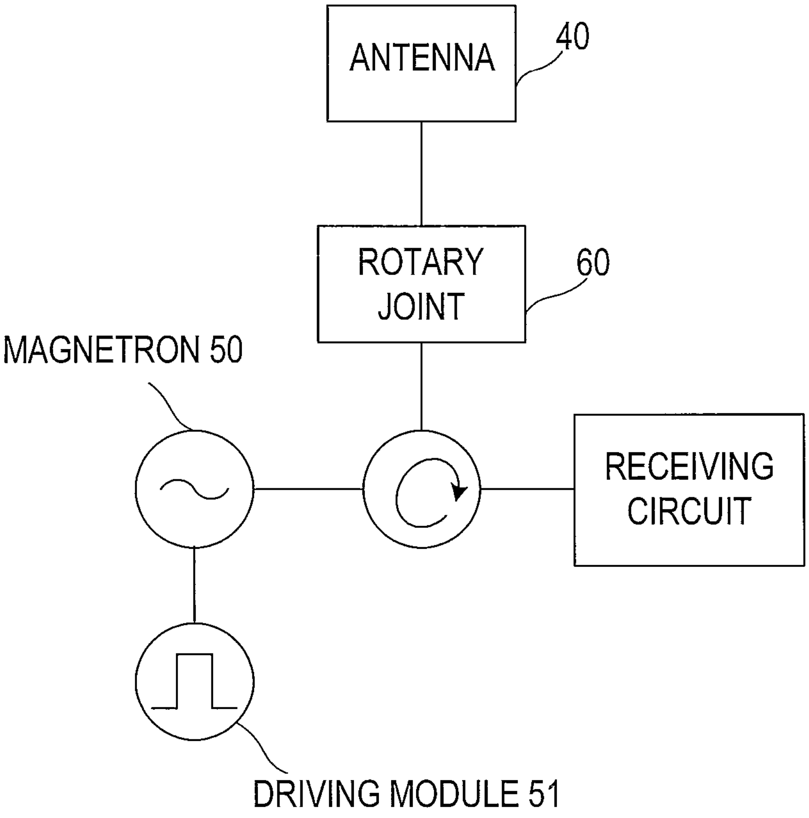
FIG. 7 is a schematic view showing a block diagram of a radar device according to one embodiment of the present invention.

The above embodiment may be applied to a radar device which is a representative example of a micro device. The radar device typically includes a high frequency circuit module. As shown in FIG. 7, the high frequency circuit module may includes a magnetron 50 for being intermittently driven by a drive module 51 to oscillate and output pulse-shaped microwaves, and a rotary joint 60 for transmitting the microwaves to an antenna module side including the rotary antenna which rotates in a horizontal plane. In this configuration, the introduction waveguide section 10 corresponds to the first waveguide and the electromagnetic-wave-transmitting waveguide section 20 corresponds to the second waveguide. When the drive module 51 drives the magnetron 50 for the pulsation, 9.41-GHz pulse-shaped microwave signals are outputted, and the signals are guided to the antenna section 40 via the rotary joint 60, the introduction waveguide section 10, the dielectric structure (waveguide converter) 30, and the electromagnetic-wave-transmitting waveguide section 20, and are emitted to the air.

The first waveguide and the second waveguide are not limited to the introduction waveguide section 10 and the electromagnetic-wave-transmitting waveguide section 20 of the above embodiment, but may be applied to any similar structures having the relation of coupling the upstream waveguide and the downstream waveguide.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A waveguide converter, comprising:

a first waveguide configured to propagate an electromagnetic wave in a first direction;

a second waveguide configured to receive, as an input, the electromagnetic wave from the first waveguide and configured to propagate the input electromagnetic wave in a second direction different from the first direction;

an elongated-plate-shaped inner conductor arranged between the first waveguide and the second waveguide such that end portions of the inner conductor are exposed to an inside of the first waveguide and an inside of the second waveguide; and an insulator, including a cylindrical portion that fits onto at least a part of the second section, configured to electrically insulate the inner conductor from inside walls of the first waveguide and inside walls of the second waveguide;

the inner conductor having a first section of a first width, the first section being exposed to the inside of the first waveguide, a second section of a second width, the second section being exposed to the inside of the second waveguide, and a convex portion in a part of the first section, and the first width being wider than the second width.

2. The waveguide converter of claim 1, wherein the first waveguide and the second waveguide have central axes that do not intersect.

3. The waveguide converter of claim 1, wherein the first waveguide has a rectangular cross section, and a width of a first side face of the first waveguide that faces the second waveguide and a width of another first side face of the first waveguide that opposes the first side face are narrower than widths of second side faces that are perpendicular to the first side faces.

4. A waveguide converter, comprising:

a first waveguide configured to propagate an electromagnetic wave in a first direction;

a second waveguide configured to receive, as an input, the electromagnetic wave from the first waveguide and configured to propagate the input electromagnetic wave in a second direction different from the first direction;

an elongated-plate-shaped inner conductor arranged between the first waveguide and the second waveguide such that end portions of the inner conductor are exposed to an inside of the first waveguide and an inside of the second waveguide; and an insulator configured to electrically insulate the inner conductor from inside walls of the first waveguide and inside walls of the second waveguide;

the inner conductor having a first section of a first width, the first section being exposed to the inside of the first waveguide, a second section of a second width, the second section being exposed to the inside of the second waveguide, and a convex portion in a part of the first section, the convex portion having a third width in a tip end portion of the first section, the first width being wider than the second width, and the third width being narrower than the first width.

5. The waveguide converter of claim 4, wherein the second section and the convex portion have substantially the same width.

6. The waveguide converter of claim 5, wherein the inner conductor has a to-be-supported section that extends from at least one of the first section and the convex portion by a predetermined length in a direction perpendicular to the elongating axis of the inner conductor.

7. The waveguide converter of claim 6, wherein the first waveguide has a supporting portion for supporting the to-be-supported section, the supporting portion being provided to a side face of the first waveguide.

8. The waveguide converter of claim 1, wherein the first waveguide and the second waveguide are arranged on the opposite side from an emitting surface of an antenna; and the antenna further comprising a radome for accommodating at least a part of the first waveguide, the second waveguide, and the antenna.

9. The waveguide converter of claim 4, wherein the first waveguide and the second waveguide are arranged on the opposite side from an emitting surface of an antenna.

10. The waveguide converter of claim 9, further comprising a radome for accommodating at least a part of the first waveguide, the second waveguide, and the antenna.

11. A waveguide converter, comprising:

a first waveguide configured to propagate an electromagnetic wave in a first direction;

a second waveguide configured to receive, as an input, the electromagnetic wave from the first waveguide and configured to propagate the input electromagnetic wave in a second direction different from the first direction;

an elongated-plate-shaped inner conductor arranged between the first waveguide and the second waveguide such that end portions of the inner conductor are exposed to an inside of the first waveguide and an inside of the second waveguide; and an insulator configured to electrically insulate the inner conductor from inside walls of the first waveguide and inside walls of the second waveguide;

the inner conductor having a first section of a first width, the first section being exposed to the inside of the first waveguide, a second section of a second width, the second section being exposed to the inside of the second waveguide, and the first width being wider than the second width; and the insulator including a cylindrical portion that fits onto at least a part of the second section.

12. The waveguide converter of claim 4, wherein the first waveguide and the second waveguide have central axes that do not intersect.

13. The waveguide converter of claim 4, wherein the first waveguide has a rectangular cross section, and a width of a first side face of the first waveguide that faces the second waveguide and a width of another first side face of the first waveguide that opposes the first side face are narrower than widths of second side faces that are perpendicular to the first side faces.

14. The waveguide converter of claim 1, wherein the second section and the convex portion have substantially the same width.

15. The waveguide converter of claim 14, wherein the inner conductor has a to-be-supported section that extends from at least one of the first section and the convex portion by a predetermined length in a direction perpendicular to the elongating axis of the inner conductor.

16. The waveguide converter of claim 15, wherein the first waveguide has a supporting portion for supporting the to-be-supported section, the supporting portion being provided to a side face of the first waveguide.

17. The waveguide converter of claim 11, wherein the first waveguide and the second waveguide have central axes that do not intersect.

18. The waveguide converter of claim 11, wherein the first waveguide has a rectangular cross section, and a width of a first side face of the first waveguide that faces the second waveguide and a width of another first side face of the first waveguide that opposes the first side face are narrower than widths of second side faces that are perpendicular to the first side faces.

19. The waveguide converter of claim 11, wherein the second section and the convex portion have substantially the same width.

20. The waveguide converter of claim 11, wherein the first waveguide and the second waveguide are arranged on the opposite side from an emitting surface of an antenna.

* * * * *